Figure 1:
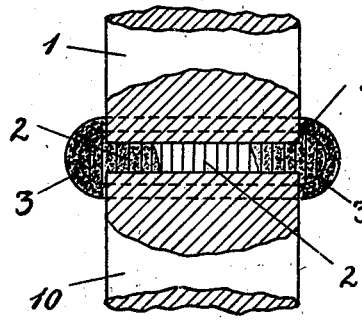

June 17, 1930.	G. BRUNHÜBNER	1,764,604
ART OF SOLDERING
Filed Dec. 24, 1926

Inventor
Georg Brunhübner
per
Attorney

Patented June 17, 1930

1,764,604

UNITED STATES PATENT OFFICE

GEORG BRUNHÜBNER, OF PFORZHEIM, GERMANY, ASSIGNOR TO ERNST GIDEON BEK, OF PFORZHEIM, GERMANY

ART OF SOLDERING

Application filed December 24, 1926, Serial No. 156,935, and in Germany October 12, 1925.

The present invention has reference to improvements in the soldering art, and relates more particularly to an improved method and means for soldering chain links, ring members, metal mesh fabric, articles of jewelry, and the like, with the main object of preventing intersoldering of the individually soldered parts.

It is a well known drawback in this art that upon soldering the link members of chains, ring mesh fabric, and the like, the individual members readily become solder-attached to one another, a very annoying occurrence known as stiff-soldering, which takes place the more readily, the finer the link wire. Various methods have already been proposed to prevent this intersoldering, for instance by the use of anti-soldering substances, such as graphite, for covering the parts to be soldered except at the joint faces, which procedure, however, though much practiced for want of something better, is not only dirty but also time-consuming and thus expensive.

In my experiments for improving the soldering operation I have found that it is not necessary to use such anti-soldering media if the solder agent, or constitutents thereof, is applied to the soldering zone and to the immediately surrounding metal parts either wholly or in part in the form of a metal powder.

According to my invention I use a soldering agent of preferably the consistency of paste, which is composed of a metal powder, a fluxing medium, and a vehicle of fatty or oleaginous character, preferably an oil, and when such a solder compound is fed to the soldering zone in well known mechanically controlled manner the oil in the paste serves incidentally to lubricate the link-forming tool faces.

I have further found that the metal constituent of such solder paste need not in itself be a complete solder, but it may be composed of a combination of metal powder and fluxing media which only during the actual soldering process form with the contacted metal portions of the parts to be soldered the solder agent proper.

Thus, for instance, in the case of silver wire stock, a highly resistive hard-solder joint may be obtained, although the solder paste contains only tin powder as metal constituent. The strength of the solder joint is the greater, the finer the metal powder, since hereby an extensive alloying action with the silver particles of the wire stock is obtained.

The metal powder should preferably show such a high degree of fineness that it will not precipitate, or at least only to a very limited degree, from the oily suspension, even if left undisturbed for some time. This fine distribution of the metal powder in its unctuous vehicle has the further advantage that there is no danger of disintegration within the solder medium, so that the character of the metal powder-flux-oil compound remains constant for each soldered joint throughout the working period of the machine.

Since only non-precious metal powder is used, the cost of the solder is correspondingly low. In view of the alloying action between the solder metal and the link wire metal, there is required a somewhat higher heating of the soldering zone, since we have to deal no longer with a purely soldering action, but with more of a welding action, as it were. The usual fluxing media, however, do not stand up well under a higher heat; for instance in the case of alkalies (borax), when soldering alpaca wire stock, this will be evidenced by the zinc becoming strongly corroded.

I have found that boric acid, owing to its weakly acid character also at higher temperatures will not attack the zinc of the alpaca stock, and the same is true of the phosphorous fluxes in soldering silver wire stock.

Since, by reason of the fine metal distribution as proposed by me, the metal surface to be fluxed is relatively extended, I prefer to use the fluxing agent in concentrated form, that is to say, the flux molecule must contain as many boron or phosphorus atoms as possible, which is assured by using in place of the ordinary boric acid for instance meta- or pyro-boric acid, and in place of a phosphorus combination amorphorus (red) phosphorus. When using a flux of this character and applying it in a relatively large amount, every metal particle will be effectively protected during the soldering step against oxidation and a perfect joint will result.

To still further assure prevention of oxidation, which would render the joint brittle, I may add to the solder certain deoxidizing substances, such as for instance tin phosphide powder.

The solder may be complete and then used by itself as such, or it may be of such character that it can be used only in combination with other complementary soldering substances, to make a complete solder in situ when exposed to heat. Thus, for instance, a very strong solder joint may be obtained in the case of solder-cored wire, when a solder preparation according to my invention is used in addition to the solder already contained in the cored wire stock; and in the well known machine-soldering method in which small bits of solder metal are mechanically introduced between the facing ends of the links just prior to the shutting movement, a small amount of the new solder may advantageously be used, for the double purpose of temporarily holding the small solder particle in its proper relative position against dropping out or displacement, and also for aiding the action of the piece solder, as above described.

In order to make my invention more readily understood, I will now describe it in detail in connection with the accompanying drawing, in all six figures of which a cross-section through a link joint is shown in more or less diagrammatic manner, with the solder medium in place, just prior to the shutting of the link.

In Fig. 1 the space between the facing ends 1 and 10 of the article to be soldered, in the illustrated case a wire link, is filled with the liquid fluxing agent 2. The soldering agent 3, in the form of a metal powder, is then applied, preferably by being dusted on, and upon the link ends 1 and 10 next being compressed into abutment, this metal coating will bulge out forming an annular flange or collar surrounding the joint. Such metal powder particles as will come into contact with the flux 2 will enter into the link gap, whilst the inner portion of the collar, on its part, will suck up flux particles by capillary action. By this interchange of parts the metal powder-flux mixture then forms a complete soldering paste, provided of course the metal powder is of solder character.

The outer circumferential zone of the metal collar, to which the flux, which latter is present only in predetermined amount, cannot penetrate and which, thus, is not changed into a self-contained soldering paste, effectively prevents a stiff-soldering between the treated link and the respectively concatenated link or links. If the metal powder forms only one constituent of a complete solder and forms only the complementary constituent to the metal of the link stock, the action and result are the same.

Figure 2:
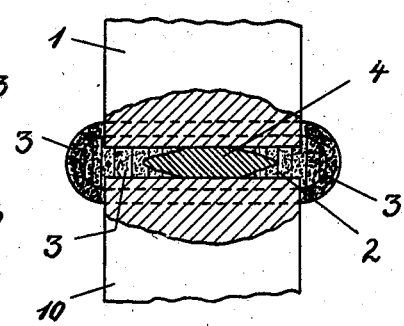
Figure 3:
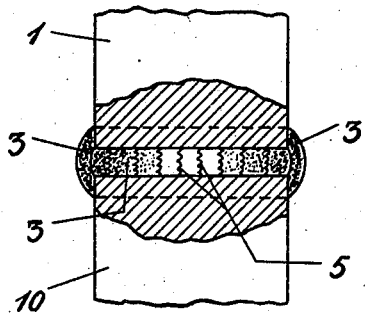
Figure 4:
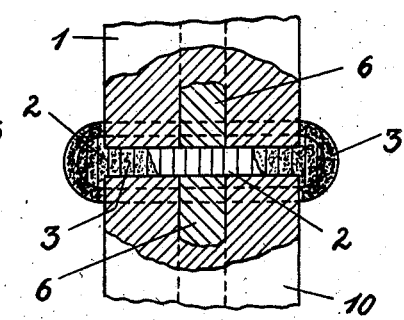
Figure 5:
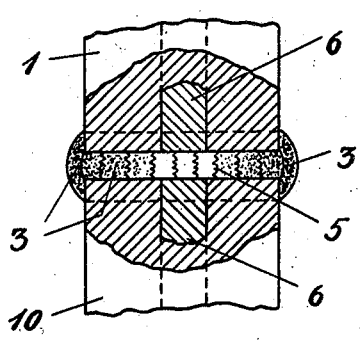

It is not necessary to apply all of the solder metal in powder form, since a portion thereof may be placed between the facing link ends 1 and 10 in the form of a metal disc 4, as shown in Fig. 2, or in the form of a flux-containing paste 5 (Fig. 3). Again, as shown in Fig. 4, the additional solder may be provided in the form of a solder core 6 in the link wire. The solder paste 5 may also be used additionally to the solder core 6, as illustrated in Fig. 5. It is, furthermore, possible to introduce a piece of solder 4 together with the solder paste 5, the latter then serving, incidentally to its main function, as sticker for keeping the piece solder in place.

Figure 6:
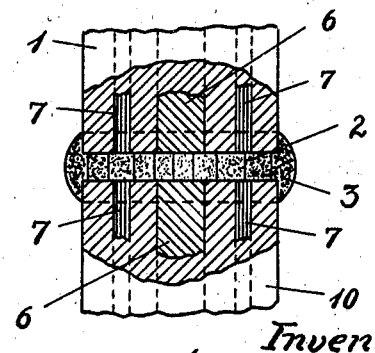

In all these modifications it is important that, for the purpose of preventing stiff-soldering of the links, the flux 2, which may also be initially imbedded in the link wire, as indicated at 7 in Fig 6, must be of such apportioned amount and of such nature that it will not penetrate the metal powder collar 3 clear through to the outer surface. When using a liquid flux it suffices to heavily dust the joint zone for keeping the collar surface free from flux.

What I claim is:—

1. A composition for use in soldering the ends of links or rings of mesh fabric, chains or the like, comprising a metal powder, red phosphorus, and an oil.

2. A composition for use in soldering the ends of links or rings of mesh fabric, chains or the like, consisting of a metal powder, red phosphorus, a deoxidizing acid, and oil.

3. A composition for use in soldering the ends of links or rings of mesh fabric, chains or the like, comprising a metal powder, red phosphorus, boric acid, and oil.

4. A composition for use in soldering the ends of links or rings of mesh fabric, chains and the like, comprising a metal powder in a finely divided state, red phosphorus in a finely divided state, a deoxydizing acid, and an oil vehicle in quantity sufficient to combine with foregoing ingredients to form a pasty mass.

5. A composition for use in soldering the ends of links or rings of mesh fabric, chains or the like, comprising a metal powder in a finely divided state, red phosphorus in a finely divided state, boric acid, and an oil mixed with the foregoing ingredients to form a pasty mass.

In testimony whereof I affix my signature.

GEORG BRUNHÜBNER.